(12) United States Patent
Andara Giannotti et al.

(10) Patent No.: US 7,585,485 B2
(45) Date of Patent: Sep. 8, 2009

(54) PROCESS FOR THE PHYSIOCHEMICAL CONDITIONING OF CHEMICAL GYPSUM OR PHOSPHO-GYPSUM FOR USE IN FORMULATION FOR CEMENT AND OTHER CONSTRUCTION MATERIALS

(75) Inventors: Miram Elena Andara Giannotti, Caracas (VE); José R. Rus Romero, Caracas (VE); Carlos Di Pasquale Torres, Caracas (VE); Morvin Ascanio Lopez, Charallave (VE); José Oropeza, Valencia (VE); Juan Carlos Suárez, Valencia (VE)

(73) Assignees: Tripoliven, C.A., Moron-Edo. Carabobo (VE); Fundacion Instituto de Ingenieria para Investigacion y Desarollo Tecnologico, Edo. Miranda (VE)

( * ) Notice: Subject to any disclaimer, the term of this patent is extended or adjusted under 35 U.S.C. 154(b) by 203 days.

(21) Appl. No.: 11/786,220

(22) Filed: Apr. 11, 2007

(65) Prior Publication Data
US 2008/0003174 A1 Jan. 3, 2008

(30) Foreign Application Priority Data
Jul. 3, 2006 (VE) .............................. 2006-001507

(51) Int. Cl.
*C01F 11/46* (2006.01)
(52) U.S. Cl. ........................ 423/555; 106/735; 106/772; 106/785; 106/786; 106/819
(58) Field of Classification Search ................. 423/555; 106/735, 772, 785, 786, 819

See application file for complete search history.

(56) References Cited

U.S. PATENT DOCUMENTS 2,216,555 A * 10/1940 King et al. .................. 106/772

(Continued)

FOREIGN PATENT DOCUMENTS

CN          1085879          4/1994

(Continued)

OTHER PUBLICATIONS

Kouloheris et al. "Chemical Nature of Phosphogypsum as Produced by Various Wet Process Phosphoric Acid Processes." *Phosphogypsum: Proceedings of the International Symposium on Phosphogypsum: The Florida Institute of Phosphate Research*. Nov. 1980. pp. 8-35.

(Continued)

*Primary Examiner*—Timothy C Vanoy
(74) *Attorney, Agent, or Firm*—Merchant & Gould P.C.

(57) ABSTRACT

The present invention is based on solid-state reaction or reactions in the presence of small amounts of water, between phospho gypsum and agglutinating-neutralizing agents, principally though the application of oxy and hydroxy compounds, without discounting use of the respective carbonates of magnesium, aluminum and principally calcium, in addition to mixtures of these, and the subsequent preparation of self-hardening pellets which facilitate transport and handling. The technological process associated with the invention notably simplifies both the number and type of individual operations, and the preparation of pellets from mixtures of phosphor gypsum; it also reduces energy costs by operating at low temperatures (150°C.) during short periods (1-2 hours), while reducing the quantity of neutralizing agents, and minimizing the volume of water required for the process.

16 Claims, 1 Drawing Sheet

U.S. PATENT DOCUMENTS

Figure 1:
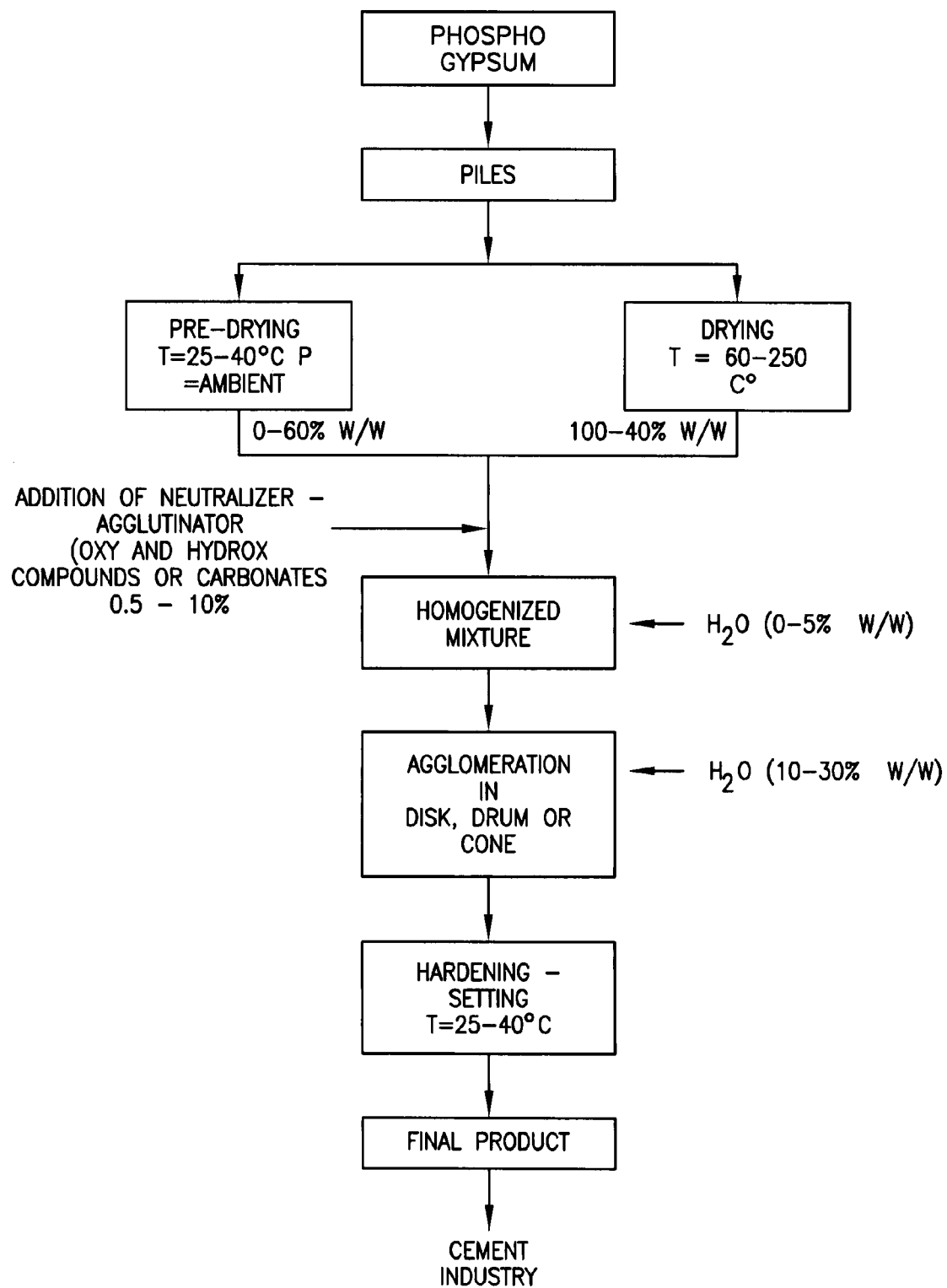

| | | | |
|---|---|---|---|
| 3,159,497 A | | 12/1964 | Yamaguchi et al. |
| 3,489,583 A | * | 1/1970 | Bloom et al. ............... 106/783 |
| 3,860,433 A | * | 1/1975 | Ost et al. .................... 106/765 |
| 3,928,053 A | | 12/1975 | Fukuda et al. |
| 3,951,675 A | | 4/1976 | Krempff |
| 3,998,596 A | | 12/1976 | Fukuda et al. |
| 4,342,732 A | * | 8/1982 | Smith ......................... 588/256 |
| 5,261,957 A | * | 11/1993 | Thornsberry et al. ........ 106/735 |

FOREIGN PATENT DOCUMENTS

| | | |
|---|---|---|
| CN | 1187477 | 7/1998 |
| CN | 1389421 | 1/2003 |
| CN | 1389422 | 1/2003 |
| CN | 1394823 | 2/2003 |
| JP | 2001-139356 | 5/2001 |
| RU | 2 215 707 | 11/2003 |

OTHER PUBLICATIONS

Mishra. "Use of Phosphogypsum in Reclamation of Sodic Soils in India." *International Symposium on Phosphogypsum: Florida Institute of Phosphate Research.* 1980. pp. 256-282.

Kuehle et al. "Energy Saving Process for Thermal Decomposition of Phosphogypsum and other Calcium Sulphates for the Production of H2SO4 and Cement Clinker by Applying the Circulating Fluid Bed—CFB." *Proceedings of the Second International Symposium on Phosphogypsum: Florida Institute of Phosphate Research.* Dec. 1986. pp. 24-37.

Baird et al. "Agricultural Use of Phosphogypsum on North Carolina Crops." *International Symposium on Phosphogypsum: Florida Institute of Phosphate Research.* 1980. pp. 157-176.

Oster, "Gypsum Usage in Irrigated Agriculture." *U.S. Salinity Laboratory, SEA, USDA*, pp. 177-204, Mar. 1982.

* cited by examiner

PROCESS FLOW DIAGRAM

PROCESS FOR THE PHYSIOCHEMICAL CONDITIONING OF CHEMICAL GYPSUM OR PHOSPHO-GYPSUM FOR USE IN FORMULATION FOR CEMENT AND OTHER CONSTRUCTION MATERIALS

The present invention concerns the application of a novel process for the physical and chemical conditioning of chemical gypsum or phospho gypsum, derived from the production of phosphoric acid, and its use as a retarding agent in the setting of Portland type cements or in the preparation of other construction materials. This conditioning is based on solid-state reactions or reactions in the presence of small amounts of water, between phospho gypsum and agglutinating-neutralizing agents, principally through the application of oxy and hydroxy compounds, without discounting use of the respective carbonates of magnesium, aluminum and principally calcium, in addition to mixtures of these, and the subsequent preparation of self-hardening pellets which facilitate transport and handling.

The technological process associated with the invention notably simplifies both the number and type of individual operations, and the preparation of pellets from mixtures of phospho gypsum; it also reduces energy costs by operating at low temperatures (150° C.) during short periods (1-2 hours), while reducing the quantity of neutralizing agents, and minimizing the volume of water required for the process.

BACKGROUND

The production of phosphoric acid uses phosphoric rock, which is leached with sulfuric acid according to several well-known processes such as the dihydrate, hemi-hydrate hemi-dihydrate methods, or processes named for the companies that introduced the technology, for example Dorr-Oliver, Nissan H & C, Fissons, Lurgi, etc. The process produces the desired product, H3PO4, and a byproduct known as phospho gypsum or chemical gypsum, $CaSO_4 \cdot 2H_2O$, according to the following reaction:

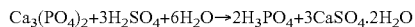

$Ca_3(PO_4)_2 + 3H_2SO_4 + 6H_2O \rightarrow 2H_3PO_4 + 3CaSO_4 \cdot 2H_2O$

This phosphor gypsum is basically made up of fine crystals, in tabular or rosette form, of sulfates of calcium dihydrate or hemi-dihydrate or mixtures thereof, depending on the process, with sizes of between 50 and 150 μm, as well as partially reacted rock or the insoluble fraction of phosphoric rock, namely silex, and oxides of iron, aluminum and magnesium, in addition to other compounds of the same metals but replaced by phosphates or polyphosphates. In addition, the phospho gypsum crystals also contain other inorganic compounds which have been absorbed or have replaced $CaSO_4$ in the crystalline structure, including $H_3PO_4$, $H_2SO_4$ and HF, which are the products of incomplete reactions ($H_2SO_4$) and the usual shortcomings in solid-liquid separation; this gives the waste product an acidic character and causes one of the main problems concerning applications for construction materials or as a substitute for natural gypsum in the manufacture of cements.

During the production of $H_3PO_4$ between four (4) and five (5) metric tons of byproduct are produced per metric ton of acid, depending on the process used. This characteristic of the process requires the construction of large tailings dams or open areas for the retention and stockpiling of the damp solid. Given the acidic nature of the waste, there can be effects on the environment from leaching or dust generation, while certain phosphoric rocks also contain radioactive elements (uranium, thorium, radium) which require containment of the waste. Furthermore, disposal of the waste calls for large areas of land, which is accordingly rendered unusable for other purposes until closure of the plant and environmental recovery of the area. As an example, for the years 1981-1982, the annual worldwide production stood at 110 million metric tons.

The requirements for obtaining alternative methods of utilizing or disposing of phospho gypsum has driven a series of technological and research efforts aimed at providing an economical solution, or at least an environmentally acceptable one, to the phospho gypsum problem.

The technologies associated with the disposal of phospho gypsum are normally focused on evaluation of the environmental impact of the selected method, or the economies achieved through the application of the available technology.

Meanwhile, there is abundant research directed towards value-adding and re-utilizing phosphor gypsum in quite varied applications, and this gives a measure of the magnitude of the problem. Research into alternative applications has been oriented towards three principal areas: the agronomic area (fertilizers and soil conditioners), the production of construction material, and use as a raw material for obtaining chemical products and materials (sulfur, cements, calcium salts and other sulfates).

In the agronomic area, the principal use is in the conditioning of soils that are clay-like, acidic, or with a high content of sodium salts, and soils with erosion problems, low seepage, and as a source of sulfates for specific crops, or as low-formulation direct-application fertilizer.

The studies into obtaining other byproducts or raw materials were based on the application of technologies associated with pyrometallurgy, such as the decomposition of phospho gypsum in the presence of coke in order to obtain sulfur and cements, in addition to calcium sulfurates. Other studies were directed toward the preparation of fertilizers, $K_2SO_4$, through chemical digestion in the presence of nutrients such as KCl and $NH_4NO_3$ or $NH_3$.

Finally, one area where research efforts are very abundant, and where there are proven industrial applications, is in materials for construction and civil works. We might expect such results in this area, given the large tonnages normally required to satisfy the demand for construction materials, especially where such materials are scarce or subject to economic competition.

In the international sphere, phospho gypsum has been utilized as an additive for regulating setting times, totally or partially replacing mineral gypsum. In the majority of cases, prior treatment of the phosphor gypsum has been necessary in order to reduce or eliminate the impurities which adversely affect the setting time, compression strength and other characteristics of prepared cement. Thus, we find that the first industrial-level application occurred in Japan, where phospho gypsum is heat treated by calcination at 800° C. (conversion to an anhydride, $CaSO_4$) and mixed with bases such as CaO, then subsequently agglomerated to obtain a cement retardant. Likewise, the company ONODA developed a technology for obtaining gypsum for construction, stucco or plaster of Paris, but in this instance using chemical methods such as washing and neutralization, filtration and drying (U.S. Pat. No. 3,998, 596, U.S. Pat. No. 3,928,053).

Similarly, Saltgitter patented a technology based on an upstream washing treatment in decanter tanks, neutralization with strong sodium or calcium bases, and hydro-cyclone separation, in order to eliminate impurities (free $P_2O_5$, F and others) and finally drying and calcination, in order to obtain a material that can be used in cement industry applications.

Other patents (CN1085879, CN1394823), operate using additives such as aluminum salts, clays, liquid byproducts of paper manufacture, CaO or Ca(OH)$_2$ to treat the phospho gypsum until a material appropriate for use is achieved.

Other patents (CN1389421, CN1389422) refer to the application of unspecified modifying agents to treat chemical gypsum and subsequent mixing, molding, curing, and drying in a confined environment for up to 48 hours, and then adjustments or calcinations at between 600 and 900° C., and finally agglomeration (CN1394823).

The technological process associated with the present invention notably simplifies the number and type of distinct operations (elimination of upstream washing and filtering), in addition to reducing energy costs by operating at low temperatures (150° C. versus 800-1200° C. for other processes) during short periods (1-2 hours), reducing the quantities of neutralizing agents (10% maximum), as well as minimizing the volume of water required in the process; moreover the total processing time from damp phospho gypsum up to production of a pellet with adequate mechanical properties is less than 24 hours.

The product is presented in the form of pellets, which allows ease of use and reduction of fine [particles]

The final composition of the phospho gypsum obtained via this invention is similar to natural gypsums and compatible with Portland type cement formulations.

DESCRIPTION OF PROCESS

FIG. 1 shows a flow diagram for the processes disclosed by the present invention. In this case the present invention involves the chemical conditioning, through application of an agglutination-neutralizing agent—normally a hydrated lime or calcium oxide base, in addition to carbonate-type compounds and compounds of other metals such as magnesium or aluminum—simultaneously with physical conditioning or the obtaining of an agglomerate with the appropriate mechanical properties, for use as a retardant in Portland type cements. The technology proposed by this invention notably simplifies previously known technologies by reducing the individual operations required for treatment; it also reduces the energy costs by operating at low temperatures (150° C. versus 800-1200° C.), thus lowering investment and operating costs, and generating a positive cash flow for companies in this sector. Furthermore this process would entail replacement of mineral gypsum imports, value-adding a waste product of phosphoric acid production plants and lessening the environmental liabilities and impact of plant operations.

The conditioning process is based on the application of solid-state reactions, at low temperatures and in three distinct operations—namely drying, mixing for the solid-state reactions, and agglomeration—performed in accordance with the steps described below:

Step 1: Pre-drying of the phospho gypsum, whether at ambient pressure and temperature conditions, or in an oven at forty degrees Celsius;

Step 2: Drying-dehydration of the phospho gypsum, between 60 and 150 and up to 250 degrees Celsius during one to two hours;

Step 3: Mixing of the dehydrated phospho gypsum at 150 degrees Celsius with dry phospho gypsum at ambient temperature, with proportions of between 0 to 60% of dry phospho gypsum at ambient temperature, or the use of 100% dehydrated phospho Gypsum;

Step 4: Addition and mixing of neutralizing-agglutinating agents, which include oxy and hydroxy compounds, without discounting possible use of the respective carbonates of magnesium, aluminum and principally calcium, in addition to mixtures of them, between 0.5 and 10% w/w of chemical gypsum for the solid-state reaction. The mixture can include the addition of water at between 0 and 5% w/w. Mixing times are between 5 minutes and 12 minutes, or up to 60 minutes, without prejudice to other possible mixing times as required according to the nature of the phospho gypsum;

Step 5: Agglomeration in a disk pelletizer, agglomerating drum or cone, using water at between 10 and 30% w/w, with subsequent hardening times at ambient temperature of between 24 and 36 hours, or else 4 hours at 40° C.

The modified and agglomerated phospho gypsum has a final free water content of less than 5% by weight and free $P_2O_5$ and F content equal to or less than 0.01% and down to 0.0001%, which makes it adequate for use (retardant) in formulations of Portland type cement without adverse effects on the mechanical properties of the concrete produced with such cements.

In the case of applications for construction materials, the phospho gypsum yielded by Step 4 is submitted to fine grinding down to a particle size of less than 45 μm; water is then added at up to 40% but preferably between 21 and 29% by weight, for preparation of the desired construction form, whether sheets, blocks or any other type.

PRACTICAL EXAMPLES

Example 1

1000 g of mixture in equal parts comprising 90% phospho gypsum pre-dried at ambient temperature or at 45° C., plus dry phospho gypsum at 150° C.; to this is added 10% calcium hydroxide and then mixed for 10 minutes in a paddle mixer running at 15 rpm. The mixture is subsequently agglomerated in a disk, adding water to the disk at up to 20%. The pellets or agglomerates are then dried at a temperature of 40° C. for 4 hours. This produces pellets of from 15 to 20 mm in size, with mechanical properties including compression resistance of up to 30 kg/pellet and drop resistance equal to or greater than 30 [repeats].

Example 2

Fifty [50] grams of magnesium and calcium hydroxide is added to 950 g of dry phospho gypsum at 150° C., and then mixed in a paddle or drum mixer for 12 minutes at a speed of 15 rpm, with addition of 5% water by weight. The mixture is then fed to a disk or drum pelletizer and water is added at up to 22% for agglomeration. The self-hardening pellets discharged from the disk are left to cure for at least 24 hours, until they reach a mechanical resistance of 20 kg/pellet and a drop resistance of at least 15 [repeats].

The modified phospho gypsum associated with this invention was used as a retardant in Portland cements, yielding a product with physical and chemical characteristics that comply with the quality standards for cements under both national and international standards.

This invention would entail the replacement of imports and a reduction in the use of natural gypsum, as well as a reduction in the environmental impact caused by mining operations to extract this mineral. Furthermore, it value-adds a waste product of phosphoric acid production plants, affording an opportunity for the reuse and application of the discarded material in the construction industry, in addition to the reduction of environmental liabilities and effects on the land and scenery.

The invention claimed is:

1. A process for the chemical and physical conditioning of phospho gypsum comprising:
   (a) drying a first portion of phospho gypsum at from about 60° C. to about 150° C. to form dehydrated phospho gypsum,
   (b) mixing the dehydrated phospho gypsum with the pre-dried phospho gypsum the pre-dried phospho gypsum formed by drying a second portion of phospho gypsum at from about ambient temperature to about 40° C., to form an homogenized mixture, wherein the dehydrated phospho gypsum comprises from about 100 to about 40 wt % of the total weight of the homogenized mixture and the pre-dried phospho gypsum comprises from about 0 to about 60 wt % of the total weight of the homogenized mixture;
   (c) mixing the homogenized mixture with agglutinating-neutralizing agent(s) to form a agglutinated-neutralized mixture, wherein the agglutinating-neutralizing agent(s) are added and mixed for neutralizing and stabilization of harmful compounds in the solid state; and
   (d) agglomerating and hardening the agglutinated-neutralized mixture by the addition of water, on an agglomerating disc or other agglomerating device, to a final content of from about 10 to about 30 wt % water, to form an agglomerated material.

2. The process according to claim 1, wherein the agglutinating-neutralizing agent(s) are selected from the group consisting of oxy-compounds, hydroxy-compounds, magnesium carbonates, aluminum carbonates, calcium carbonates and mixtures thereof.

3. The process according to claim 1, wherein the agglutinating-neutralizing agent(s) are added from about 0.5 to about 10 wt % of homogenized mixture.

4. The process according to claim 1, wherein mixing the homogenized mixture with agglutinating-neutralizing agent(s) takes place from about 5 minutes to about 60 minutes.

5. The process according to claim 4, wherein mixing the homogenized mixture with agglutinating-neutralizing agent(s) takes place from about 5 minutes to about 12 minutes.

6. The process according to claim 1, wherein mixing the homogenized mixture with the agglutinating-neutralizing agent(s) further comprises the addition of from about 0.5 to about 5 wt % water.

7. The process according to claim 1, wherein the agglomerating and hardening is carried out using a device selected from the group consisting of a pelletizing disc, an agglomerating drum and an agglomerating cone for obtaining an agglomerated and granulated material.

8. The process according to claim 1, wherein the agglomerating and hardening step is characterized by hydration reactions in the agglomerated material which hardens the agglomerated material.

9. The process according to claim 8, wherein the agglomerating and hardening of the agglutinated-neutralizing mixture is carried out in the range of from about 4 hours at 40° C. to about to about 36 hours at ambient temperature.

10. The process according to claim 1, further comprising milling the agglomerated material to achieve a size of about 45 μm and adding up to 40 wt % of water to form a milled material.

11. The process according to claim 10, wherein the water is added in an amount from about 21 to about 29 wt %.

12. The process of claim 10 further comprising:
   (f) using the milled material for application as a construction material.

13. The process of claim 1 further comprising:
   (e) adding the agglomerated material to Clinker and its application as cement setting retardant.

14. The process of claim 13 further comprising:
   adding the agglomerated material to Clinker and its application as cement setting retardant wherein setting times are from about 0.75 to about 8 hours.

15. The process of claim 1 wherein the agglomerated material exhibits enhanced recrystallization hardening, and enhanced setting characteristics due to the neutralization and stabilization of the harmful compounds.

16. A product from the process of claim 1 wherein the product comprises:
   phospho gypsum wherein harmful components have been neutralized and stabilized by solid state reactions.

* * * * *